United States Patent
Jang (10) Patent No.: US 10,343,692 B2
(45) Date of Patent: Jul. 9, 2019

(54) METHOD AND APPARATUS FOR PREVENTING DIESELING OF ENGINE FOR MILD HYBRID ELECTRIC VEHICLE

(71) Applicant: HYUNDAI MOTOR COMPANY, Seoul (KR)

(72) Inventor: Hwa Yong Jang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 252 days.

(21) Appl. No.: 15/369,461

(22) Filed: Dec. 5, 2016

(65) Prior Publication Data

US 2018/0072318 A1 Mar. 15, 2018

(30) Foreign Application Priority Data

Sep. 9, 2016 (KR) .......................... 10-2016-0116719

(51) Int. Cl.
*B60W 20/00* (2016.01)
*B60W 30/192* (2012.01)

(52) U.S. Cl.
CPC .......... *B60W 30/192* (2013.01); *B60W 20/00* (2013.01); *B60W 2510/0638* (2013.01); *B60W 2520/10* (2013.01); *B60Y 2200/92* (2013.01)

(58) Field of Classification Search
None
See application file for complete search history.

(56) References Cited

U.S. PATENT DOCUMENTS

| | | | | |
|---|---|---|---|---|
| 3,577,966 A | * | 5/1971 | Collingwood | F02M 3/02 123/198 DC |
| 3,741,178 A | * | 6/1973 | Cedar | F02M 11/02 123/198 DB |
| 3,744,470 A | * | 7/1973 | Clarke | F02M 3/08 123/179.18 |
| 3,753,427 A | * | 8/1973 | Cedar | F02M 3/062 123/179.18 |
| 3,788,288 A | * | 1/1974 | Harrison | F02M 3/04 123/198 DB |
| 3,805,760 A | * | 4/1974 | Yagi | F02M 3/02 123/198 DB |
| 3,867,919 A | * | 2/1975 | Grenier | F02D 17/00 123/198 D |

(Continued)

FOREIGN PATENT DOCUMENTS

| | | |
|---|---|---|
| JP | 2012-091579 A | 5/2012 |
| JP | 2012-153311 A | 8/2012 |

(Continued)

*Primary Examiner* — Navid Ziaeianmehdizadeh
(74) *Attorney, Agent, or Firm* — Morgan Lewis & Bockius LLP (57) ABSTRACT

A method of preventing dieseling of an engine for a mild hybrid electric vehicle includes steps of: determining whether an ignition switch is set to an OFF position; determining whether an engine stop condition is satisfied when the ignition switch is set to the OFF position; determining a target time point that completes a rotation of a mild hybrid starter and generator (MHSG) according to an engine speed when the engine stop condition is satisfied; and controlling a speed of the MHSG from a time point when the engine stop condition is satisfied to the target time point to reduce a speed of the engine.

7 Claims, 5 Drawing Sheets

(56) References Cited

U.S. PATENT DOCUMENTS

| | | | | |
|---|---|---|---|---|
| 4,016,852 A | * | 4/1977 | Konishi | F02D 17/04 |
| | | | | 123/198 DB |
| 4,116,178 A | * | 9/1978 | Saito | F02M 26/57 |
| | | | | 123/568.27 |
| RE30,844 E | * | 1/1982 | Yagi | F02M 19/122 |
| | | | | 123/198 DB |
| 4,367,720 A | * | 1/1983 | Miyoshi | F02M 26/57 |
| | | | | 123/568.27 |
| 4,653,445 A | * | 3/1987 | Book | F02D 17/04 |
| | | | | 123/198 D |
| 6,195,985 B1 | * | 3/2001 | del Re | B60K 6/46 |
| | | | | 60/274 |
| 6,478,015 B2 | * | 11/2002 | Oki | F02D 41/0032 |
| | | | | 123/516 |
| 2002/0165660 A1 | * | 11/2002 | Boggs | B60K 6/445 |
| | | | | 701/112 |
| 2007/0004555 A1 | * | 1/2007 | Berger | B60W 10/023 |
| | | | | 477/115 |
| 2014/0229088 A1 | * | 8/2014 | Matsumoto | B60K 6/445 |
| | | | | 701/102 |

FOREIGN PATENT DOCUMENTS

| | | |
|---|---|---|
| JP | 2016-83976 A | 5/2016 |
| KR | 10-20150119130 A | 10/2015 |

\* cited by examiner

| S1 | S2 | S3 | S4 | Result |
|----|----|----|----|--------|
| 1 | 0 | 0 | 1 | Motor moves right |
| 0 | 1 | 1 | 0 | Motor moves left |
| 0 | 0 | 0 | 0 | Motor coasts |
| 0 | 1 | 0 | 1 | Motor brakes |
| 1 | 0 | 1 | 0 | Motor brakes |
| 1 | 1 | 0 | 0 | Short circuit |
| 0 | 0 | 1 | 1 | Short circuit |
| 1 | 1 | 1 | 1 | Short circuit |

0 : Open
1 : Close

METHOD AND APPARATUS FOR PREVENTING DIESELING OF ENGINE FOR MILD HYBRID ELECTRIC VEHICLE

CROSS-REFERENCE TO RELATED APPLICATION

This application claims the benefit of priority to Korean Patent Application No. 10-2016-0116719, filed in the Korean Intellectual Property Office on Sep. 9, 2016, the entire content of which is incorporated herein by reference.

TECHNICAL FIELD

The present disclosure relates to a method and apparatus for preventing dieseling of an engine for a mild hybrid electric vehicle.

BACKGROUND

In general, a hybrid electric vehicle uses both an internal combustion engine and battery power. That is, a hybrid electric vehicle efficiently combines and uses both the power of an internal combustion engine and the power of a motor.

The hybrid electric vehicle may be divided into a mild type and a hard type according to a power share ratio between the engine and the motor. In a mild type hybrid electric vehicle (hereinafter, referred to as a mild hybrid electric vehicle), a mild hybrid starter and generator (MHSG) that starts an engine instead of an alternator, or that generates electricity by an output of the engine is provided. In a hard type hybrid electric vehicle, an integrated starter and generator (ISG) that starts an engine or that generates electricity by an output of the engine, and a drive motor that drives the vehicle are separately provided.

The mild hybrid electric vehicle does not have a running mode that drives the vehicle with only a torque of the MHSG, but may assist an engine torque according to a running state using the MHSG and may charge the battery (e.g., battery of 48V) through regenerative braking. Accordingly, fuel consumption of the mild hybrid electric vehicle can be improved.

Dieseling refers to an abnormal combustion phenomenon of an engine which occurs when residual fuel within a combustion chamber spontaneously ignites as an ignition source and is referred to as run-on. In a state in which the engine is overheated, when an ignition switch is turned off, the dieseling may occur. When dieseling occurs, if the engine continues to operate, a vibration occurs and thus it is necessary to remove the vibration.

When an ignition switch is turned off, a diesel engine closes an air control valve (ACV) to block air inflow to the engine, thereby preventing dieseling. However, a driver hears the sound according to the operation of the ACV as noise, and in order to block air inflow according to operation of the ACV, a certain amount of time is required.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a method and apparatus for preventing dieseling of an engine for a mild hybrid electric vehicle having advantages of being capable of preventing dieseling of the engine by controlling a speed of an MHSG.

An exemplary embodiment of the present disclosure provides a method of preventing dieseling of an engine for a mild hybrid electric vehicle including: determining whether an ignition switch is set to an OFF position; determining whether an engine stop condition is satisfied when the ignition switch is set to the OFF position; determining a target time point that completes a rotation of a mild hybrid starter and generator (MHSG) according to an engine speed when the engine stop condition is satisfied; and controlling a speed of the MHSG from a time point when the engine stop condition is satisfied to the target time point to reduce a speed of the engine.

The engine stop condition may be satisfied if the engine speed is equal to or less than a first reference speed and a speed of the mild hybrid electric vehicle is equal to or less than a second reference speed.

The target time point may be determined based on the engine speed at the time point in which the engine stop condition is satisfied.

Another embodiment of the present disclosure provides a dieseling prevention apparatus for an engine for a mild hybrid electric vehicle including: a mild hybrid starter and generator (MHSG) that starts the engine or that generates electricity by an output of the engine; an ignition switch including a plurality of contact points; a data detector that detects data for preventing dieseling of the engine; and a controller that determines whether an engine stop condition is satisfied based on the data when the ignition switch is set to an OFF contact point. The controller determines a target time point that completes a rotation of the MHSG according to an engine speed when the engine stop condition is satisfied, and controls a speed of the MHSG from a time point when the engine stop condition is satisfied to the target time point to reduce the engine speed.

The engine stop condition may be satisfied if the engine speed is equal to or less than a first reference speed and a speed of the mild hybrid electric vehicle is equal to or less than a second reference speed.

The controller may determine the target time point according to the engine speed at the time point in which the engine stop condition is satisfied.

The data detector may include: an engine speed sensor detecting an engine speed; and a vehicle speed sensor detecting a speed of the mild hybrid electric vehicle.

As described above, according to an exemplary embodiment of the present disclosure, by controlling a speed of an MHSG, dieseling of an engine can be prevented.

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, a size and thickness of each element are randomly represented for better understanding and ease of description, and the present disclosure is not limited thereto.

Figure 1:
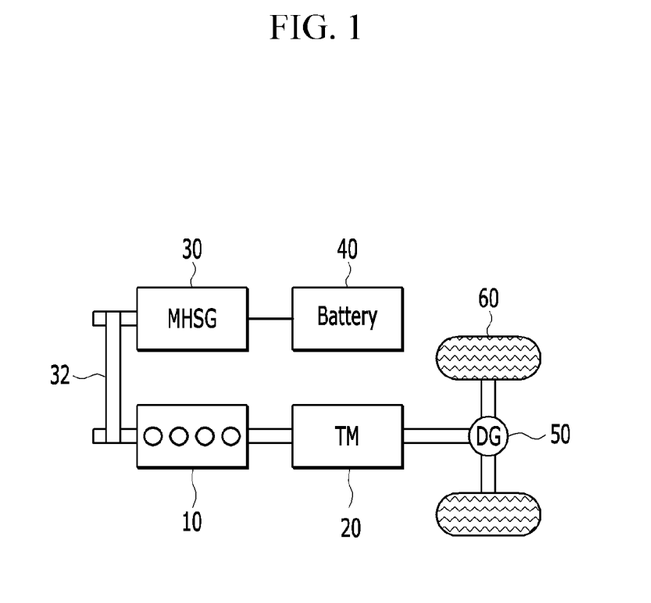
FIG. 1 is a block diagram illustrating a mild hybrid electric vehicle according to an exemplary embodiment of the present disclosure.

FIG. 1 is a block diagram illustrating a mild hybrid electric vehicle according to an exemplary embodiment of the present disclosure.

As shown in FIG. 1, a mild hybrid electric vehicle according to an exemplary embodiment of the present disclosure includes an engine 10, a transmission 20, a mild hybrid starter and generator (MHSG) 30, a battery 40, a differential gear apparatus 50, and a wheel 60.

The engine 10 generates a torque by burning fuel, and various engines such as a gasoline engine, a diesel engine, and a liquefied petroleum injection (LPI) engine may be used.

In a power delivery system of the mild hybrid electric vehicle, a torque of the engine 10 is transferred to an input shaft of the transmission 20, and a torque that is output from an output shaft of the transmission 20 is transferred to an axle via the differential gear apparatus 50. As the axle rotates the wheel 60, the mild hybrid electric vehicle runs by a torque of the engine 10.

The transmission 20 may be an automatic transmission or a manual transmission. In an automatic transmission, by controlling a hydraulic pressure by driving a plurality of solenoid valves according to a speed of the mild hybrid electric vehicle and a location of an accelerator pedal, a shift gear of a target gear stage is operated and thus a gear shift is automatically performed. In a manual transmission, a gear shift is performed by a driver manipulation that moves a gear lever to a desired gear stage while stepping on a clutch pedal.

The MHSG 30 converts electrical energy to mechanical energy or mechanical energy to electrical energy. That is, the MHSG 30 may generate electricity by starting the engine 10 or an output of the engine 10. Further, the MHSG 30 may assist a torque of the engine 10. The mild hybrid electric vehicle may use a torque of the MHSG 30 as auxiliary power while using the combustion torque of the engine 10 as main power. The engine 10 and the MHSG 30 may be connected through a belt 32.

The battery 40 may supply power to the MHSG 30 or may be charged through power that is recovered through the MHSG 30. The battery 40 is a high voltage battery (e.g., battery of 48V) and may be a lithium-ion battery. The mild hybrid electric vehicle may further include a low voltage DC-DC converter (LDC) that converts a voltage that is supplied from the battery 40 to a low voltage and a low voltage battery (e.g., battery of 12V) that supplies a low voltage to an electronic equipment load (e.g., head lamp, air-conditioner) using a low voltage.

Figure 2:
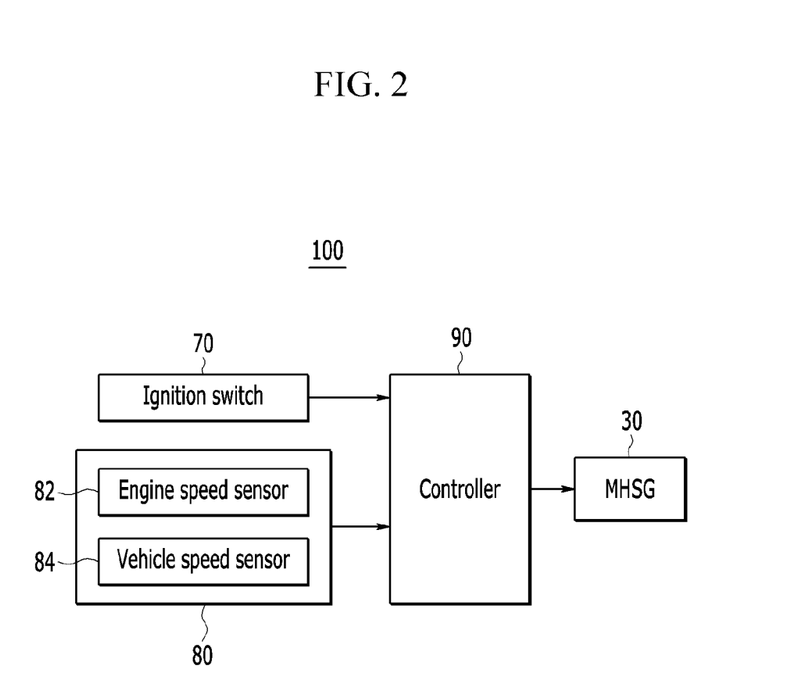
FIG. 2 is a block diagram illustrating a dieseling prevention apparatus of an engine for a mild hybrid electric vehicle according to an exemplary embodiment of the present disclosure.

FIG. 2 is a block diagram illustrating a dieseling prevention apparatus of an engine for a mild hybrid electric vehicle according to an exemplary embodiment of the present disclosure.

As shown in FIG. 2, a dieseling prevention apparatus 100 of an engine for a mild hybrid electric vehicle according to the present exemplary embodiment may include an ignition switch 70, a data detector 80, a controller 90, and an MHSG 30.

The ignition switch 70 may include a plurality of contact points. The plurality of contact points may include an OFF contact point, an ACC contact point, an ON contact point, and a START contact point. When the OFF contact point is selected, the engine 10 is turned off. When the ACC contact point is selected, accessory devices such as a radio may be used. When the ON contact point is selected, electronic devices using a voltage of the battery 40 may be used. When the START contact point is selected, the engine 10 is started. Contact points of the ignition switch 70 may be selected by a starting key or a starting button.

The data detector 80 detects data for preventing dieseling of the engine 10, and data that are detected by the data detector 80 are transferred to the controller 90. The data detector 80 may include an engine speed sensor 82 and a vehicle speed sensor 84. The data detector 80 may further include detectors (e.g., accelerator pedal location detector, brake pedal location detector) for controlling the mild hybrid electric vehicle.

The engine speed sensor 82 detects a speed of the engine 10 and transfers a signal thereof to the controller 90.

The vehicle speed sensor 84 detects a speed of the mild hybrid electric vehicle and transfers a signal thereof to the controller 90.

The controller 90 may control operation of the MHSG 30 based on a signal of the ignition switch 70 and the data detector 80. The controller 90 may be implemented with at least one processor operating according to a program, and the program may include a series of instructions for performing each step that is included in a method of preventing dieseling of an engine for a mild hybrid electric vehicle according to an exemplary embodiment of the present disclosure to be described later.

Figure 3:
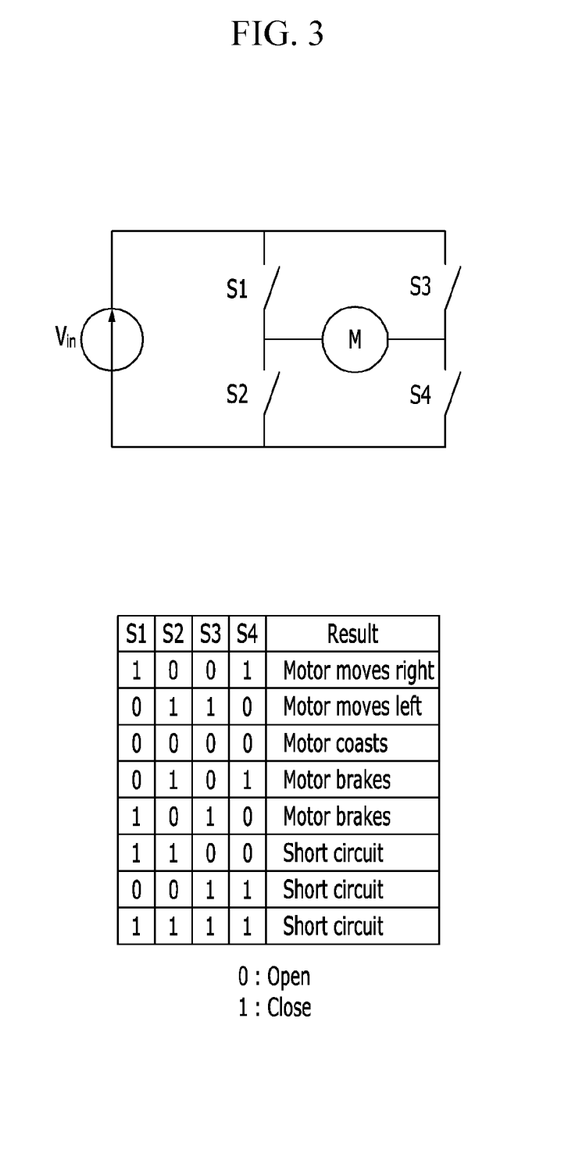
FIG. 3 is a diagram illustrating a circuit structure for controlling operation of an MHSG according to an exemplary embodiment of the present disclosure.

FIG. 3 is a diagram illustrating a circuit structure for controlling operation of an MHSG according to an exemplary embodiment of the present disclosure.

As shown in FIG. 3, the controller 90 may control operation of the MHSG 30 through an H-Bridge circuit structure. The controller 90 may include a plurality of switching elements S1 to S4, and may control operation of the MHSG 30 according to a switching operation of the switching elements S1 to S4. That is, the MHSG 30 may rotate in a forward direction or a reverse direction, may rotate by inertia, or may stop according to a switching operation of the switching elements S1 to S4. The controller 90 may determine a pulse-width modulation ("PWM") duty based on a signal of the ignition switch 70 and the data detector 80. The PWM duty may have a value of 0 when a duty ratio (a ratio of a switching cycle of a switching element and a turn-on time of the switching element) is 0% and have a value of 1 when a duty ratio is 100%. The switching elements S1 to S4 may perform a switching operation to control a speed of the MHSG 30 according to the determined PWM duty.

Hereinafter, a method of preventing dieseling of an engine for a mild hybrid electric vehicle according to an exemplary embodiment of the present disclosure will be described in detail with reference to FIGS. 4 and 5.

Figure 4:
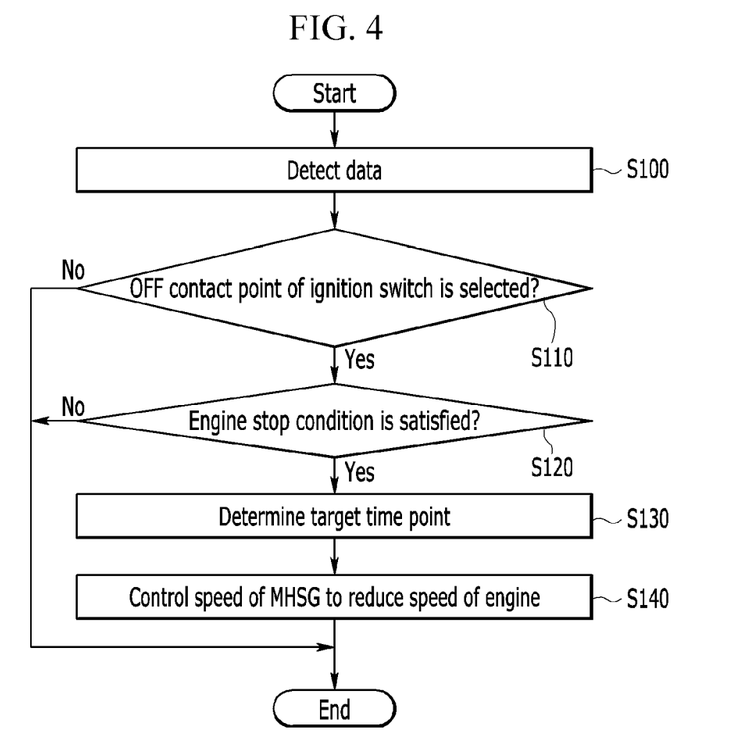
FIG. 4 is a flowchart illustrating a method of preventing dieseling of an engine for a mild hybrid electric vehicle according to an exemplary embodiment of the present disclosure.
Figure 5:
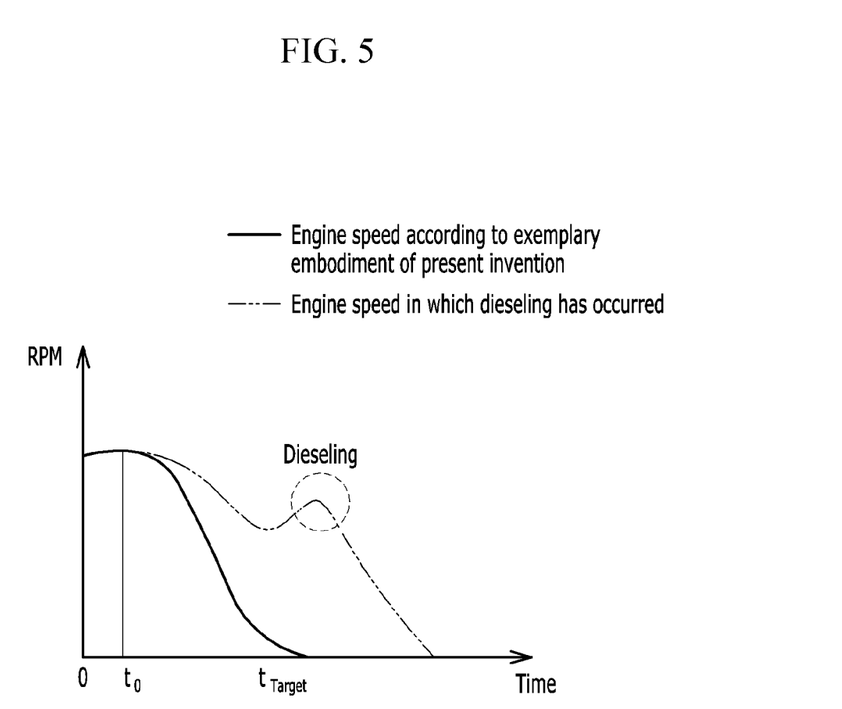
FIG. 5 is a graph illustrating a method of preventing dieseling of an engine for a mild hybrid electric vehicle according to an exemplary embodiment of the present disclosure.

FIG. 4 is a flowchart illustrating a method of preventing dieseling of an engine for a mild hybrid electric vehicle according to an exemplary embodiment of the present disclosure, and FIG. 5 is a graph illustrating a method of preventing dieseling of an engine for a mild hybrid electric vehicle according to an exemplary embodiment of the present disclosure.

Referring to FIGS. 4 and 5, a method of preventing dieseling of an engine for a mild hybrid electric vehicle according to an exemplary embodiment of the present disclosure begins by detecting data for preventing dieseling of the engine 10 (S100). That is, the engine speed sensor 82 detects a speed of the engine 10, and the vehicle speed sensor 84 detects a speed of the mild hybrid electric vehicle.

The controller 90 determines whether an OFF contact point of the ignition switch 70 is selected (S110).

If an OFF contact point of the ignition switch 70 is not selected at step S110, a method of preventing dieseling of an engine for a mild hybrid electric vehicle according to the present exemplary embodiment is terminated.

If an OFF contact point of the ignition switch 70 is selected at step S110, the controller 90 determines whether an engine stop condition is satisfied (S120). If a speed of the engine 10 is equal to or less than a first reference speed and if a speed of the mild hybrid electric vehicle is equal to or less than a second reference speed, the engine stop condition may be satisfied. The first reference speed may be set to a speed that is determined to be a preferable speed by a person of ordinary skill in the art in consideration of idle RPM of the engine 10. The second reference speed may be set to a speed that is determined to be a preferable speed by a person of ordinary skill in the art in order to determine a stop state of the mild hybrid electric vehicle.

If the engine stop condition is not satisfied at step S120, a method of preventing dieseling of an engine for a mild hybrid electric vehicle according to the present exemplary embodiment is terminated.

If the engine stop condition is satisfied at step S120, the controller 90 may determine a target time point $t_{Target}$ that completes a rotation of the MHSG 30 based on a speed of the engine 10 (S130). That is, the controller 90 may determine a target time point $t_{Target}$ that completes rotations of the engine 10 and the MHSG 30 based on a speed of the engine 10 at a time point $t_0$ in which the engine stop condition is satisfied. For example, as a speed of the engine 10 increases at a time point $t_0$ in which the engine stop condition is satisfied, the target time point $t_{Target}$ may increase.

The controller 90 controls a speed of the MHSG 30 from a time point $t_0$ in which the engine stop condition is satisfied to the target time point $t_{Target}$ to reduce a speed of the engine 10 (S140). Accordingly, a speed of the engine 10 smoothly reduces from the initial time point $t_0$ to the target time point $t_{Target}$.

The controller may refer to a hardware device including a memory and a processor configured to execute one or more steps interpreted as an algorithm structure. The memory stores algorithm steps, and the processor specifically executes the algorithm steps to perform one or more of the described processes.

Further, the disclosed method may be implemented by a non-transient computer-readable medium on a computer-readable means including executable program instructions executed by a processor, a controller, or the like. Examples of a computer-readable medium, although not restrictive, include ROMs, RAMs, CD-ROMs, magnetic tapes, floppy disks, flash drives, smart cards, and optical data storages.

As described above, according to an exemplary embodiment of the present disclosure, by controlling a speed of the MHSG 30, dieseling of the engine 10 can be prevented.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method of preventing dieseling of an engine for a mild hybrid electric vehicle, the method comprising steps of:
   determining whether an engine stop condition is satisfied responsive to determining that an ignition switch is set to an OFF position;
   determining a target time point $t_{Target}$ that completes a rotation of a mild hybrid starter and generator (MHSG) where an engine speed is zero and $t_o$ corresponding to the time when the engine stop condition is satisfied; and
   controlling a speed of the MHSG from the time point $t_o$ when the engine stop condition is satisfied to the target time point $t_{Target}$ to reduce a speed of the engine.

2. The method of claim 1, wherein the engine stop condition is satisfied when the engine speed is equal to or less than a first reference speed and a speed of the mild hybrid electric vehicle is equal to or less than a second reference speed.

3. The method of claim 1, wherein the target time point is determined based on the engine speed at the time point when the engine stop condition is satisfied.

4. A dieseling prevention apparatus of an engine for a mild hybrid electric vehicle, the dieseling prevention apparatus comprising:
   a mild hybrid starter and generator (MHSG) that starts the engine or that generates electricity by an output of the engine;
   an ignition switch including a plurality of contact points;
   a data detector that detects data for preventing dieseling of the engine; and
   a controller that determines whether an engine stop condition is satisfied based on the data when the ignition switch is set to an OFF contact point,
   wherein the controller determines a target time point $t_{Target}$ that completes a rotation of the MHSG where an engine speed is zero and $t_0$ corresponding to the time when the engine stop condition is satisfied, and controls a speed of the MHSG from the time point $t_0$ when the engine stop condition is satisfied to the target time point $t_{Target}$ to reduce the engine speed.

5. The dieseling prevention apparatus of claim 4, wherein the engine stop condition is satisfied if the engine speed is equal to or less than a first reference speed and a speed of the mild hybrid electric vehicle is equal to or less than a second reference speed.

6. The dieseling prevention apparatus of claim 4, wherein the controller determines the target time point based on the engine speed at the time point when the engine stop condition is satisfied.

7. The dieseling prevention apparatus of claim 4, wherein the data detector comprises:
   an engine speed sensor detecting an engine speed; and a vehicle speed sensor detecting a speed of the mild hybrid electric vehicle.

\* \* \* \* \*